UNITED STATES PATENT OFFICE.

LOUIS C. JONES AND FRED L. GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING CONSTITUENTS OF VALUE FROM ALKALINE DEPOSITS.

1,215,543. Specification of Letters Patent. Patented Feb. 13, 1917.

No Drawing. Application filed August 30, 1916. Serial No. 117,512.

*To all whom it may concern:*

Be it known that we, LOUIS C. JONES and FRED L. GROVER, citizens of the United States, residing at Syracuse, in the county of Onondaga and State of New York, have invented a new and Improved Process of Recovering Constituents of Value from Alkaline Deposits, of which the following is a specification.

Our invention relates particularly to the recovery of constituents of value from deposits such as the brine of Searles Lake in California which contains sodium carbonate, sodium sulfate and sodium chlorid, besides salts of potassium and borax.

In an application filed by us of even date herewith we have described a simple but efficient process for recovering potassium chlorid from such deposits in which the brine is initially concentrated at a high temperature without previously removing its sodium carbonate content. In that process the sodium carbonate is precipitated along with sodium sulfate and sodium chlorid and is discarded as waste.

The object of our present invention is to retain the advantages as to the recovery of potassium chlorid incident to heating and concentrating a solution of the salts while containing sodium carbonate and at the same time to recover the sodium carbonate content of the brine in the shape of sodium bicarbonate.

To this end we first carbonate the brine by passing carbon dioxid gas through it in any usual or suitable manner so as to convert the sodium carbonate content into sodium bicarbonate which precipitates and is filtered out. After the removal of the sodium bicarbonate such quantity of sodium carbonate is added that the solution when concentrated at a high temperature will be saturated therewith and the sulfate radical will be practically eliminated, and the solution is then concentrated at such high temperature, say 50° C. as a minimum, and upward as will allow ample margin for subsequent cooling. We have found by experience that the best results are obtained with a temperature of from 100° C. to 115° C.

By such heating and concentration two results are effected. Boric acid and less readily soluble boric acid salts, as sodium tetraborate, react with the sodium carbonate present and are converted into sodium metaborate which is much more soluble than potassium chlorid; and, second, sodium carbonate, sodium sulfate, and sodium chlorid are precipitated while potassium chlorid is, owing to the presence of the sodium carbonate, kept in the solution which, as the concentration proceeds, tends to become saturated therewith. As the operation is repeated with successive batches of brine the precipitate thrown down and removed in this step of the process is added to the batch of brine from which the sodium carbonate has been removed in the succeeding repetition of the operation, the same sodium carbonate thus being used over and over indefinitely for supplying the quantity of that salt required to be present in the brine when heated. If desired in the first run the preliminary step of carbonating the brine may be omitted thus obtaining the initial quantity of sodium carbonate called for from the brine itself instead of from an extraneous source.

In case it is not desired to recover the entire carbonate content of the brine as bicarbonate we may treat a portion of each batch of brine to convert its carbonate content into bicarbonate and then add such treated portion to the untreated portion, the sodium carbonate of the latter being sufficient for the purpose of our invention for the whole batch.

When the concentration has reached the point where the solution is approximately saturated with potassium chlorid the heating is stopped and the precipitate filtered out. The solution is then cooled so as to precipitate potassium chlorid which comes down in a practically pure state, the sodium metaborate remaining in solution, and is then filtered out. In order to recover the potassium chlorid remaining in the mother liquor, the mother liquor is mixed with the succeeding batch of brine to be treated.

Since, however, the sodium metaborate content will increase with successive batches to the saturation point it is necessary to draw off and treat the mother liquor from time to time in any usual or suitable manner to remove the sodium metaborate, when the mother liquor can be again returned to be re-treated for a further recovery of potassium chlorid.

A convenient method of removing the sodium metaborate, which is more fully described in an application for Letters Patent for a process of recovering borax from alkaline deposits filed by us of even date herewith, consists in passing carbon dioxid gas through the mother liquor at a relatively high temperature, whereby the sodium metaborate is reconverted into sodium tetraborate, according to the reaction

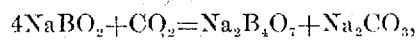

which precipitates out upon cooling. This reaction takes place readily at a temperature of from 50° C. to 60° C. The mother liquor may then be returned to the brine for retreatment or it may be treated directly by heating and concentration until saturated with potassium chlorid and then cooling, as in the first instance, to recover a second crop of potassium chlorid, after which it should be returned to the brine.

From the foregoing it will be seen that by means of our invention we not only conserve the sodium carbonate content of the brine but also realize the advantage of recovering its potassium content in a pure state and by a simple and economical procedure.

What we claim as new and desire to secure by Letters Patent is:

1. The process of recovering constituents of value from alkaline brines containing sodium carbonate and potassium salts which consists in carbonating the brine to convert sodium carbonate into sodium bicarbonate and precipitating and removing the bicarbonate, adding to the solution sodium carbonate in such quantity as to prevent upon concentration the precipitation of potassium salts until the solution is saturated with potassium chlorid, concentrating the solution at a high temperature so as to convert boric acid and less soluble boric acid salts into more soluble sodium metaborate and precipitate sodium carbonate, sodium chlorid, and sodium sulfate and leave the potassium salts in solution and finally cooling to precipitate potassium chlorid.

2. The process of recovering constituents of value from alkaline brines containing sodium carbonate and potassium salts which consists in carbonating the brine to convert sodium carbonate into sodium bicarbonate, and removing the sodium bicarbonate, adding to the solution sodium carbonate in such quantity as to prevent upon concentration the precipitation of potassium salts until the solution is saturated with potassium chlorid, concentrating the solution at a high temperature so as to precipitate sodium carbonate, sodium chlorid, and sodium sulfate while leaving sodium metaborate and potassium chlorid in solution and finally cooling the solution to precipitate potassium chlorid.

3. The process of recovering constituents of value from alkaline brines containing sodium carbonate and potassium salts which consists in carbonating the brine to convert sodium carbonate into sodium bicarbonate and removing the sodium bicarbonate, adding to the solution sodium carbonate in such quantity as to prevent, upon concentration, the precipitation of potassium salts until the solution is saturated with potassium chlorid, concentrating the solution at a high temperature so as to precipitate sodium carbonate, sodium chlorid and sodium sulfate and, in the succeeding repetitions of the process, adding the sodium carbonate thus precipitated to the solution after the removal of the sodium bicarbonate.

4. The process of recovering constituents of value from alkaline brines containing sodium carbonate and potassium salts which consists in carbonating a portion of each batch of brine to convert its sodium carbonate content into sodium bicarbonate and removing the bicarbonate, adding the treated portion of the batch to the untreated portion and then concentrating at a high temperature so as to precipitate sodium carbonate, sodium chlorid and sodium sulfate while leaving potassium chlorid in solution and finally cooling to precipitate potassium chlorid.

In testimony whereof we have affixed our signatures, this 28th day of August, 1916.

LOUIS C. JONES.
FRED L. GROVER.